United States Patent Office 3,438,781
Patented Apr. 15, 1969

3,438,781
METHOD OF DETECTING FAT SOLUBLE VITAMINS IN ANIMAL FEED
Melvin J. MacMillan, Cranford, and Charles M. Ely, Berkeley Heights, N.J., assignors to Diamond Shamrock Corporation, a corporation of Delaware
No Drawing. Filed Feb. 27, 1964, Ser. No. 347,678
Int. Cl. A23l 1/16, 1/30
U.S. Cl. 99—2                                     1 Claim

ABSTRACT OF THE DISCLOSURE

Detecting the presence of vitamin particles in an animal by visually counting the number of colored particles and confirming the visual count by pressing absorbent paper against the colored particles and inspecting the surface thereof.

---

This invention relates to the visual quality control of the vitamin content in feed mixes, suppliments and premixes. More particularly, this invention relates to a method of producing colored vitamins so that the presence of these vitamins can be easily detected by the human eye in feeds and feed premixes.

The problem of detecting the presence of vitamins in animal feeds so as to provide a quality control has been a long standing problem in the art. This is true since in many cases when vitamins are mixed in animal feeds, uniformity is not obtained, i.e., one portion of the feed contains very little, if any, vitamins while another portion of the feed contains an over-abundance of vitamins. Hence, the animal which is fed the portion of the feed which contains an excess of vitamins gets an overdose of vitamins which can be harmful to the animal. On the other hand, the animal which is fed the portion of the feed containing little, if any, vitamins may get a deficiency of vitamins.

Various methods such as coloring the vitamins as disclosed in U.S. Patent No. 2,685,517, Dunmire, Aug. 3, 1954, and in U.S. Patent No. 2,868,644, Eisenberg, Jan. 13, 1959, have been suggested to detect the presence of vitamins in animal feeds. However, these procedures have suffered from the drawback that while the vitamin particles have been colored, these colored vitamin pellets are so small that they cannot be detected visaully in the animal feed. Therefore, in order to determine the presence of these vitamins in a feed, a sample of the feed must be analyzed by means such as a high powered lense or by a magnifying glass or by removing the vitamin pellets from the feed as done in U.S. Patent No. 2,685,517, Dunmire, Aug. 3, 1954.

In order to combat this, various methods have been prepared to increase the size of the vitamin particles. However, workers in the field have found it almost impossible to increase the size of the vitamin particles without increasing the effective vitamin potency contained in each particle. The great disadvantage of increasing the vitamin potency of an individual vitamin-containing particle is that in order to produce the proper dose of vitamins in the feed, fewer vitamin-containing particles must be used. By utilizing fewer vitamin-containing particles, it becomes increasingly harder to evenly distribute and disperse the vitamin-containing particles throughout an animal feed. Hence in preparing a vitamin fortified feed having a given vitamin potency, by utilizing a vitamin containing particle containing a high vitamin potency, a smaller number of partcles are utilized. In this manner it becomes hard to uniformly distribute and disperse the particles throughout the feed. Thus, the high potency particles become segregated throughout the feed so that the vitamin potency is not distributed uniformly throughout the feed. Additionally by utilizing feeds containing vitamin particles having a high vitamin potency, there is a danger of over-supply of vitamins to the animals, which can be harmful.

It is an object of this invention to provide colored vitamin particles that can easily be detected by the human eye when these particles are admixed with feeds while keeping the vitamin potency of each particle as low as possible.

It is a further object of this invention to produce different vitamin-containing particles of different colors, each color designating a different vitamin, so that the presence of each vitamin in animal feeds can be qualitatively detected by the human eye.

It is a further object of this invention to provide a method for qualitatively determining the presence of vitamins in an animal feed by means of the human eye without the need of removing the vitamin-containing particles from the feed.

It is a further object of this invention to provide a method for qualitatively determining the presence of several different vitamins in an animal feed by means of the human eye without the need of separating the vitamin particles from the feed.

It is a further object of this invention to provide a vitamin-containing particle that has increased stability against deterioration as compared to the common commercially available vitamin particles.

It is a further object of this invention to provide a new vitamin fortified feed composition wherein the vitamin is more readily available and effective biologically when compared to the products of the prior art.

Further objects of the invention will be obvious and will, in part, appear hereinafter.

We have unexpectedly discovered that when a non-toxic dye is formulated in combination with a fat-soluble vitamin, preferably vitamins A and D, a water-soluble dextrin and a non-toxic edible antitoxidant into a product comprising a multiplicity of substantially solid particles, the colored particles thus produced have an enhanced vitamin stability and can easily be detected in animal feed by the human eye without the need for removing the vitamin-containing particles from the feed or utilizing complicated analytical techniques. Furthermore, by formulating vitamin containing particles by the method of this invention, it is possible to produce particles having a low vitamin potency. In this manner vitamin fortified feeds having a given vitamin potency can be produced from a large number of vitamin containing particles so that it is easy to visually detect these particles in animal feeds. When colored vitamin-containing particles are produced in a manner so that each different colored particle designates the presence of a different vitamin and these different colored particles are mixed into an animal feed, the presence of these different colored vitamin particles can be detected in animal feed by the human eye without the need of removing these vitamin-containing particles from the animal feed or without utilizing any complicated separating technique. Additionally, these particles when mixed into an animal feed, produce a vitamin fortified feed in which the vitamins are more readily available and effective biologically than are the vitamins in the vitamin fortified feeds of the prior art.

The phenomena whereby colored vitamin-containing particles are produced that can be detected in animal feeds by means of the human eye without need for complicated analytical means by formulating a non-toxic dye, a water-soluble dextrin, a fat-soluble vitamin such as vitamins A and D, and a non-toxic antioxidant into a particle is not completely understood, however, it is believed that the aforementioned beneficial results are attributable to the fact that the water-soluble dextrin acts as a matrix binder providing a unique plasticizing effect so that separate small areas of high vitamin potency are distributed in the form of tiny platelets of high bulk density throughout each individual particle. In this manner, a multitudinous amount of colored vitamin-containing particles are produced in the form of large flakes with a correspondingly large surface area for each given unit of vitamin potency rather than in the form of tiny spherical pellets or beads containing one individual area of vitamin potency and density. Furthermore, it is believed that the dextrin exerts a secondary effect in that it acts as a color distributor and brightener for a non-toxic dye so that all portions of the individual flakes are uniformly dyed with a brilliant bright color producing flakes of a predetermined color which can easily be detected by the human or naked eye in animal feeds.

As seen from the above discussion, the unique and unexpected results achieved by the vitamin-containing particles of this invention are due to the use of a water-soluble dextrin in combination with a non-toxic dye. We have found that by utilizing other polysaccharides or hydrocarbons in place of dextrin in formulating dyed vitamin-containing particles, the flake-like formation of the particles of this invention are not achieved. Instead, one obtains colored particles which are spherical in shape and which cannot be readily seen by the human eye when present in animal feeds. Furthermore, we have found that when other polysaccharides or hydrocarbons such as gelatin are utilized to prepare vitamin-containing particles, the enhanced vitamin stability as well as the enhanced biological effectiveness and availability are not achieved.

The water-soluble dextrin which in combination with the non-toxic dye produces the unique vitamin-containing particles of this invention are well known. These dextrins are derived from starches of various materials such as corn, potato, tapioca, wheat, sage, sweet potato, rice, soybean, maize, etc. The starches which are derived from these sources are treated with acids, enzymes, alkali, pyrolysis, etc. to lower the molecular weight of the starch so that it goes into solution. These converted starch products have a dextrose equivalent generally within the range of from about 1% D.E. to approximately 40% D.E. Broadly, the amount of dextrin that should be present in formulating the products of this invention can be varied. Preferably the colored products of this invention may contain from about 70% to 95% by weight of dextrin, based on the weight of the vitamin-containing particle. Utilizing amounts of over 95% will in some cases reduce the potency of the final product.

In formulating the product of this invention, one may utilize any of the natural or artificially produced fat-soluble vitamins such as vitamin A, vitamin D, vitamin E or vitamin K, or mixtures thereof as the source of the vitamins in the practice of the invention. Activated sterols, such as ergosterol or irradiated 7-dehydro-cholesterol, vitamin A in alcohol form, vitamin A which has been produced by synthetic methods, fish oils, fish liver oils, vitamin concentrates prepared from such oils, etc. can be used in producing our novel product. Vitamin A in ester form such as vitamin A acetate and vitamin A palmitate, can also be used. Moreover, precursors of vitamin A, such as carotene can be used in the production of our products in place of vitamin A, if desired. It is preferred that the vitamin source have a vitamin potency of from about 20,000 U.S.P. units per gram to about 3,000,000 U.S.P. units per gram or higher depending upon the final vitamin potency of the desired product. Generally, for good results it is best that the final vitamin-containing particles of this invention contain a vitamin potency of at least about 1,500 U.S.P. units of vitamin per gram and, preferably between about 100,000 to about 600,000 U.S.P. units of vitamin per gram. Generally, it is seldom necessary to prepare particles having a vitamin potency greater than 900,000 U.S.P. units.

Any one of the conventional antioxidants may be utilized in the practice of this invention. Among the many edible antioxidants that may be used in accordance with this invention are antioxidants, such as, propyl gallate, butylated hydroxy anisoles, ethoxyquin, butylated hydroxy toluene, gallic acid, nondihydroguaiaretic acid, etc. and mixtures thereof. In addition to these, however, one may use other edible antioxidants, as for example, vitamin E, mixed tocopherols and natural antioxidants of the types disclosed and claimed in U.S. Patents Nos. 2,345,576, 2,345,578, 2,433,593, and 2,434,790. Natural antioxidants of the type which are produced by the processes disclosed and claimed in U.S. Patents Nos. 2,396,680 and 2,396,681 as well as other similar edible antioxidants, can be employed also. Mixtures of such antioxidants can be used, if desired. In fact, a mixture of ethoxyquin and butylated hydroxy toluene can be used in producing the preferred products of the invention. In addition, one can employ the antioxidants in admixture with compounds which act as synergists therefor, that is, with compounds which have little, if any, effect in and of themselves as antioxidants but which exert a synergistic action upon the antioxidant. Included among such compounds are lecithin, citric acid, alkyl phosphates, etc. Furthermore, only relatively small quantities of edible antioxidant need be used. While it is preferred to employ from about 0.1% by weight of antioxidant based on the weight of the vitamin-containing particle, seldom if ever, will it be necessary to incorporate more than about 5.0% by weight thereof into our products.

Any non-toxic dye can be utilized to color the fat-soluble vitamins in accordance with this invention to produce colored vitamin-containing particles which can be easily detected in the feed by the human eye. Among the many non-toxic dyes which may be utilized in accordance with this invention are the dyes approved for use in foods, drugs and cosmetics by the Food and Drug Administration. These dyes are commonly known as F.D. & C. dyes, some of which are set forth in 21 C.F.R., part 9 (color certification), subpart B. Typical F.D. & C. dyes which can be used in accordance with this invention include F.D. & C. Green #1, F.D. & C. Green #2, F.D. & C. Red #2, F.D. & C. Red #3, F.D. & C. Red #4, F.D. & C. Yellow #5, F.D. & C. Yellow #6, F.D. & C. Violet #1, F.D. & C. Blue #1, F.D. & C. Blue #2, etc. Additionally, only small quantities of dye need be used to adequately color the vitamin-containing particles so that the presence of these particles can be detected by the human eye. Therefore, it is seldom necessary to employ more than about 5% by weight, preferably less than about 2% by weight of the dye based on the total weight of the vitamin-containing particles, in formulating the vitamin-containing particles of this invention. However, we have found that utilizing at least 0.1% by weight of the total weight of the vitamin-containing particles of the non-toxic dye in preparing the vitamin-containing particle is best for providing a color that can be easily detected in animal feeds.

The water-soluble dextrin which is utilized in preparing the product of this invention provides a unique stabilizing effect. The vitamins in the product are protected almost indefinitely against oxidative deterioration caused by atmospheric moisture and storage at rather high temperatures without utilizing any of the conventional stabilizers. However, if desired, any conventional stabilizers may be incorporated into the product of this invention without deleteriously affecting the product of this invention. Typical of the many stabilizers which may be incorporated into the vitamin formulation include ground soybean meal, corn germ meal, cottonseed meal, linseed meal, wheat germ meal, corn meal, alfalfa leaf meal, wheat bran, oat meal, peanut meal, bolted rice polish, wheat flour, soya flour, etc. Since the dextrin has the effect of acting as a stabilizer, it is seldom necessary to incorporate any of the conventional stabilizers into the composition.

The products of our invention are readily prepared in the following manner. The water-soluble dextrin is first dissolved in water. The fat-soluble vitamin-containing material, the edible antioxidant and the non-toxic dye can then be added in sequence to the dextrin solution. Where an edible stabilizer is also employed in preparing the products of this invention that ingredient is added to the dextrin solution. The order in which the ingredients are admixed is not of critical importance. For example, rather than preparing the water solution of dextrin first and then adding the materials, one could first prepare a mixture of all of the ingredients of the product except the dextrin and then add the dextrin solution to the ingredients.

The fluid mass that will be obtained by any of these procedures will contain all of the components substantially uniformly distributed with respect to each other. While in this fluid condition at elevated temepratures, the mass is easily converted by any convenient or practical means, into flakes by evaporating the water so as to convert this fluid mass into solid desired flake-like particles of this invention. These solid particles have the dextrin, the vitamin-containing material and the edible antioxidant in what, in general, may be termed a congealed solid phase. Where an edible stabilizer has been used, it will be suspended as discreet particles in each of the flakes.

In general, solid colored vitamin-containing particles in the desired flake-like shape can be commercially obtained by converting the fluid mass containing the aforementioned ingredients into the desired flake shape by any conventional process of making vitamin-containing particles. A typical method of producing the flake-shaped particles from the fluid mass is by heating the fluid mass to about 80° C. and thereafter passing the heated fluid mass through a conventional homogenizer. Generally for best results, it is preferable to utilize a sonic-type homogenizer which achieves a fine breakdown of the soluble vitamins to fine particles measuring about 0.5 to about 1.0 micron in diameter. The homogenized fluid material can then be dried to form the solid flake-like particles on a double drum drier exposed to the atmosphere. In practice, the atmospheric double drier generally consists of two steam heated revolving metal plated drums which are supported on trunnions which turn in heavy bearings resting on heavy box frames. In supplying the homogenized fluid to the drum drier, it has been found best to provide two end boards at both ends of each drum which form a reservoir into which the homogenized fluid is fed from the homogenizer. Therefore, as the drums turn inward and downward into the reservoir, they are coated with the fluid mass from the reservoir. The drum are preferably heated by means of steam so that boiling starts when the fluid mass contacts the drum. In this manner water is removed from the fluid mass leaving the dry flake-like material in the form of a continuous sheet on the drum. The flake-like material can be removed from the drum by any conventional means such as knives, which contact the outer side of the drum. As the drum rotates against the knives' surfaces, the flake-like coating is removed from the drum. The removed flake-like material can then be finely granulated by any conventional method to produce a final material of a size that is best utilizable in animal feeds. Generally, it has been found that flakes of such a size that will pass through a 20 mesh screen but will be retained by a 200 mesh screen are best suited for animal feeds.

The vitamin-containing products of our invention may be utilized to fortify any conventional animal feed. Typical animal feeds which can be fortified with the materials of this invention include feeds for hogs, poultry of all types, horses, cows, sheep and any other domestic animal. Generally, the vitamin fortified feeds in the form supplied directly to the animal should contain a total fat-soluble vitamin potency of from about 1,000 I.U. per pound of feed to about 50,000 I.U. per pound of feed. Feeds containing a total fat-soluble vitamin potency of less than 1,000 I.U. per pound of feed may be formulated, however, in some cases, especially when vitamin A constitutes the major portion of the vitamin content of the feed, it becomes increasingly difficult to observe the presence of the vitamins at these levels in the feed without removing the vitamin particles from the feed. Additionally, in some cases, it has been found that feeds having a vitamin potency of over 50,000 I.U. per pound of feed have a deleterious effect upon the animals.

By utilizing the colored vitamin-containing particles of this invention in animal feeds, the presence of the vitamins wthin the animal feed can easily be detected by the human eye without the need for separating the vitamin-containing particles from the animal feed or utilizing other complicated separating techniques. Furthermore, the amount of particles per unit of vitamin potency is so much greater than that produced by utilizing the prior art vitamin-containing materials that it is easier and simpler to disperse the vitamin-containing particles throughout the feed. Additionally, the products of our invention are also outstanding for a number of different reasons. In the first place, the vitamin-containing products of this invention are highly stable against deterioration without the need for utilizing any of the conventional stabilizers. In this manner, the vitamins in the product are protected against the oxidation that occurs through storage at rather high temperatures. Moreover, by virtue of our invention, the vitamins are provided in a form in which they are protected against the influences of minerals with which they are associated in the animal and poultry feed.

For a fuller understanding of the nature of this invention reference may be made to the following examples which are given merely to illustrate the invention and are not to be construed in a limiting sense.

Example I

The following example is directed to producing colored vitamin palmitate containing particles having a vitamin potency of about 125,000 U.S.P. units per gram in accordance with this invention.

A dextrin solution was prepared by charging under constant agitation 88.62 parts by weight of canary dextrin produced by the pyroconversion of corn starch, said dextrin having a D.E. of about 3% into 60 cc. of water which had been heated to 80° C. The corn starch dextrin quickly dissolved in the water and the temperature of the solution was maintained at 60° C. To this solution there was added 0.50 part by weight of F.D. & C. dye Red #4. The dye dissolved in the dextrin solution at the temperature of 60° C.

A vitamin A palmitate mixture was prepared by mixing 1.41 parts by weight of ethoxyquin and 0.47 part by weight of butylated hydroxy toluene with 9 parts by weight of vitamin A palmitate (1,500,000 units of vitamin A per gram) by agitation under a nitrogen atmosphere at a temperature of 45° C. After a uniform mixture of vitamin A palmitate was obtained, this mixture was added to the dextrin solution while maintaining the temperature at 60° C. The dextrin solution was thoroughly admixed by agitation under a nitrogen atmosphere with the vitamin A palmitate mixture. After about 10 minutes, agitation was stopped and the resulting fluid was homogenized in a Waring blender for about two minutes. The resulting homogenized material was a smooth, red colored liquid. This liquid was then dried overnight on a stainless steel sheet at about 25° C. The dried material was scraped off the sheet with a spatula in the form of large curled flakes. The flakes were then granulated through a series of USS Wire Mesh Sieves to produce a material which passed through 20 mesh screen but was retained by a 200 mesh screen. Each flake of the granulated material had a bright red color. The product was assayed for its vitamin A palmitate content. The vitamin potency of these particles was about 125,000 U.S.P. units per gram.

Example II

This example is directed to producing colored vitamin A acetate containing particles having a potency of about 250,000 U.S.P. units per gram in accordance with this invention.

A dextrin solution was prepared by charging under agitation 85.93 parts by weight of the canary dextrin described in Example I into 60 cc. of water which had been heated to 80° C. The corn starch dextrin quickly dissolved in the water and the temperature of the solution was maintained at 60° C. To this solution, there was added 0.50 part by weight of F.D. & C. dye Red No. 4. The dye dissolved in the dextrin solution at the temperature of 60° C.

A vitamin A acetate mixture was prepared by mixing 1.7 parts by weight of ethoxyquin and 0.56 part by weight of butylated hydroxy toluene with 11.31 parts by weight of vitamin A acetate (2,387,000 units of vitamin A per gram) by agitation under a nitrogen atmosphere at a temperature of 45° C. After a uniform vitamin A acetate mixture was obtained, this mixture was added to the dextrin solution while maintaining the temperature at 60° C. The dextrin solution was thoroughly admixed by agitation under a nitrogen atmosphere with the vitamin acetate mixture. After about 10 minutes, agitation was stopped and the resulting fluid was homogenized in a Waring blender for about two minutes. The resulting homogenized material was a smooth red liquid. This liquid was then dried overnight on a stainless steel sheet at about 25° C. The dried material was scraped off the sheet with a spatula in the form of large curled flakes. The flakes were then granulated through a series of USS Wire Mesh Sieves to produce a material which passed through a 20 mesh screen but was retained by a 200 mesh screen. Each flake of the granulated material had a bright red color. The product was assayed for its vitamin A content. The vitamin A potency of these particles was about 250,000 U.S.P. units per gram.

Example III

This example is directed to producing vitamin A palmitate and acetate containing particles having a potency of about 350,000 units per gram in accordance with this invention.

A dextrin solution was prepared by charging under constant agitation, 80.43 parts by weight of the canary dextrin described in Example I into 60 cc. of water which had been heated to 80° C. The corn starch dextrin quickly dissolved in the water and the temperature of the solution was maintained at 60° C. To this solution, there was added 0.50 part by weight of F.D. & C. dye Red No. 4. The dye dissolved in the dextrin solution at 60° C.

A vitamin A solution was prepared by mixing 2.26 parts by weight of ethoxyquin and 0.50 part by weight of butylated hydroxy toluene with 13.93 parts by weight of vitamin A acetate (2,387,000 units of vitamin A per gram) and 2.38 parts by weight of vitamin A palmitate (1,500,000 units of vitamin A per gram) by agitation under a nitrogen atmosphere at a temperature of 45° C. After a uniform vitamin A mixture was obtained, this mixture was added to the dextrin solution while maintaining the temperature at 60° C. The dextrin solution was thoroughly admixed by agitation under a nitrogen atmosphere with the vitamin A mixture. After about 10 minutes, agitation was stopped and the resulting fluid was homogenized in a Waring blender for about two minutes. The resulting homogenized material was a smooth red colored liquid. This liquid was then dried overnight on a stainless steel sheet at about 25° C. The dried material was scraped off the sheet with a spatula in the form of large curled flakes. The flakes were then granulated through a series of USS Wire Mesh Sieves to produce a material which passed through a 20 mesh screen but was retained by a 200 mesh screen. Each flake of the granulated material had a bright red color. The product was assayed for its vitamin A content. The vitamin A potency of these particles was about 350,000 U.S.P. units per gram.

Example IV

The following example is directed to producing colored vitamin D containing particles having a potency of about 200,000 U.S.P. units per gram.

A dextrin solution was prepared by charging under constant agitation, 92.05 parts by weight of the canary dextrin described in Example I in 60 cc. of water which had been heated to 80° C. The corn starch dextrin quickly dissolved in the water and the temperature of the solution was maintained at 60° C. To this solution, there was added 0.25 part by weight of F.D. & C. dye Blue No. 1. The dye dissolved in the dextrin solution at 60° C.

A vitamin D mixture was prepared by mixing 4.0 parts by weight of butylated hydroxy toluene with 3.7 parts by weight of vitamin D in vegetable oil (5,500,000 U.S.P. units of vitamin D per gram) by agitation under a nitrogen atmosphere at a temperature of 45° C. After a uniform vitamin D mixture was obtained, this mixture was added to the dextrin solution while maintaining the temperature at 60° C. The dextrin solution was thoroughly admixed by agitation under a nitrogen atmosphere with the vitamin D mixture. After about 10 minutes, agitation was stopped and the resulting fluid was homogenized in a Waring blender for about two minutes. The resulting homogenized material was a smooth blue liquid. The liquid was then dried on a stainless steel sheet overnight at about 25° C. The dried material was scraped off the sheet with a spatula in the form of large curled flakes. The flakes were granulated through a series of USS Wire Mesh Sieves to produce a material which passed through a 20 mesh screen but was retained by a 200 mesh screen. Each flake of the granulated material had a bright blue color. The product was assayed for its vitamin D content. The vitamin D content of these particles was about 200,000 U.S.P. units per gram.

Example V

This example is directed to producing colored vitamin A palmitate beadlets utilizing gelatin.

300 grams of commercially available corn syrup were added to 800 ml. of water. The mixture was heated to 65° C. and 372 grams of Pharmagel A, a high quality pharmaceutical grade gelatin, were added. The mixture was stirred and heated at 75° C. until a solution was obtained. 145 grams of vitamin A palmitate (1,500,000 units per gram) were then added to the solution. The temperature at this point dropped to 65° C. To the resultant mixture were added 1600 mls. of mineral oil which had been heated to 65° C. The mixture was agitated until a small suspension of globules or droplets in the oil were obtained. When these particles were obtained agitation was continued while the suspension in oil was cooled by means of an ice bath to 10° C. To the mixture was added 2,500 mls. of isopropanol which had previously been cooled to 10° C. The mixture was stirred for 5 minutes and the gel containing vitamin A were passed through a Buchner funnel. The product was then added to a liter of isopropanol at 10° C. The mixture was stirred for 5 minutes and the product was again filtered. This served to remove most of the residual oil and also served to dehydrate the gelatin granules.

The product was then placed on trays in a low humidity (10% to 20%) atmosphere at room temperature for about 15 to 16 hours. The dried product still retained a small film of oil on the surface of the particles. The dry product was washed twice with a 750 ml. portion of acetone to complete the dehydration and it was then air-dried. Since the particle size was not completely uniform, although a high percentage may be prepared within a fairly uniform particle size range, the product was screened to remove particularly fine globules. The product described and obtained above had a vitamin A potency about 250,000 units per gram.

This product was dyed by dipping at room temperature the particles thus obtained in a water solution containing 5% by weight of F.D & C. Red No. 4. After 20 minutes these particles were removed from the dye bath and allowed to dry by standing at room temperature overnight. These dyed particles had a red color.

Example VI

This example is directed to preparing beadlets of vitamin A acetate utilizing gelatin.

The exact procedure of Example V was carried out except that 67 grams of vitamin A acetate (2,387,000 units per gram) was utilized in place of the vitamin A palmitate of Example V. Additionally 35 grams of hydrogenated peanut oil were added along with 372 grams of Pharmagel A. The product obtained had a vitamin A potency of about 250,000 units per gram.

These particles were dyed in the exact manner described in Example V.

Example VII

This example is directed to producing beadlets of vitamin D utilizing gelatin.

The exact procedure of Example V was carried out except that 22.5 grams of vitamin D in vegetable oil (5,500,000 units per gram) was utilized in place of the vitamin A acetate of Example V. Additionally 79.5 grams of hydrogenated peanut oil was added along with the 372 grams of Pharmagel A. The product obtained had a vitamin $D_3$ potency of 200,000 units per gram.

This product was dyed by dipping at room temperature the particles thus obtained in a water solution containing 5% by weight of F.D. & C. Blue No. 1. After 20 minutes these particles were removed from the dye bath and allowed to dry by standing at room temperature overnight. These dyed particles had a blue color.

Example VIII

This example is directed to comparing the particle count per unit of potency of the vitamin-containing particles utilizing gelatin.

The active particles per million units of vitamin potency of the products of Examples I, II and IV through VII was determined in the following manner. The amount of particles in 1 gram of each of the products of Examples I, II and IV through VII were counted. The active particle count per million units of vitamin potency was determined by dividing the known potency per gram of each of these products into 1,000,000 and multiplying this result by the number of active particles visually counted in one gram. The results are tabulated in Table I.

TABLE I.—COMPARATIVE ACTIVE PARTICLE COUNT OF DEXTRIN-CONTAINING PARTICLES VERSUS GELATIN-CONTAINING VITAMIN PARTICLES

| Particle Systems | Active particle count per million units of vitamin potency |
| --- | --- |
| Example: | |
| I —— Vitamin A palmitate, dextrin | 2,130,000 |
| II —— Vitamin A acetate, dextrin | 1,065,000 |
| IV —— Vitamin D, dextrin | 2,360,000 |
| V —— Vitamin A palmitate, gelatin | 407,000 |
| VI —— Vitamin A acetate, gelatin | 407,000 |
| VII —— Vitamin D, gelatin | 508,750 |

As seen from the above table, the vitamin-containing products of this invention produced by utilizing dextrin in a formulating vitamin-containing particles have for a given vitamin potency a greater amount of particles than products produced by utilizing other materials such as gelatin in formulating vitamin-containing particles. This is seen by comparing the active particle count per million units of vitamin potency of Examples I, II and IV which utilize dextrin with the results obtained in Examples V through VII utilizing gelatin. As seen from the above table, the amount of particles produced per unit of vitamin potency by utilizing dextrin is at least about two and one-half times the amount of particles per unit of vitamin potency produced by utilizing gelatin. The greater amount of particles per unit of vitamin potency of the product of this invention insures the production of colored particles which are easily visible when mixed into feeds. Additionally, this high active particle count insures a better uniform dispersion when these particles are mixed into feeds which in turn results in better and more uniform animal nutrition.

Examples IX and X are directed to comparing the ability of colored dextrin-containing vitamin particles to be visually detected in animal feed with the ability of colored gelatin-containing vitamin particles to be detetced in animal feeds.

The dry determination test which is utilized in Examples IX and X is carried out in the following manner. One-quarter pound of animal feed which is fortified with the colored vitamins is screened through a 40 mesh sieve. The portion that goes through the 40 mesh sieve is rescreened through a 60 mesh sieve. Approximately 15 grams of the vitamin-containing feed is retained on the 60 mesh sieve. The portion that is retained on the 60 mesh sieve is divided into eight samples and placed on separate circular pieces of No. 4 Whatman White Filter Paper having a diameter of about 10 inches. The paper containing the feed is then visually examined for specks of color. Each observed speck of color is counted and recorded.

In preparing the wet determination, the paper containing the feed which is utilized for the dry determination is folded over to form a semicircle so that the bottom inside portion of the paper contains the feed. The paper is then completely wetted by means of spraying water over the paper. After the paper is sopping wet, the paper is manually pressed together so that the inside surface of the paper contacts the colored particles. After pressing is completed, the filter paper is opened up to its original shape and the paper is visually scanned for color marks which appeared on the surface of the paper. These color marks are counted and recorded.

EXAMPLE IX

This example is directed to a visual determination of gelatin containing vitamin particles of the prior art in animal feeds.

A 15 lb. batch of a poultry feed having the following ingredients:

| Ingredient: | Weight percent |
| --- | --- |
| Ground milo | 60.0 |
| Soybean oil meal, 44% protein | 34.0 |
| Steamed bone meal | 2.0 |
| Ground limestone | 1.5 |
| Salt (NaCl) | 0.5 |
| Vitamin premix [1] | 2.0 |

[1] The vitamin premix which contributes 2.0% of the feed consisted of the following ingredients: (the amount of ingredient is based upon 100 pounds weight of feed)—200 mg. riboflavin; 500 mg. dl-calcium pantothenate; 1,200 mg. niacin; 2,000 mg. choline chloride (100% basis); 0.5 mg. vitamin $B_{12}$; 40,000 I.C.U. vitamin $D_3$; 200 mg. procaise penicillin; and 10 mg. magnesium sulfate.

was mixed with 0.12 grams of the dyed red gelatin vitamin A palmitate particles (potency of 250,000 U.S.P. units per gram) prepared in Example V and 0.0375 grams of the dyed blue vitamin D gelatin particles (potency of 200,000 units per gram) prepared in Example VII. The final feed had a vitamin A potency of 2,000 I.U. per lb. and a vitamin D potency of 500 I.U. per lb. The vitamin particles and the feed were thoroughly admixed by means of mechanical agitation. After thorough admixing, the vitamin fortified feed was analyzed by the dry examination and the wet examination outlined hereinbefore to detect the presence of the colored particles in the feed. The results of these tests appear in Table II.

TABLE II.—VISUAL DETERMINATION OF THE COLORED PARTICLES PRESENT IN THE FEED BY MEANS OF WET AND DRY EXAMINATION

|  | Dry Examination | | | Wet Examination | | |
|---|---|---|---|---|---|---|
|  | Red Particles | Blue Particles | Total Particles Counted | Red Spots Counted | Blue Spots Counted | Total Spots Counted |
| Sample: | | | | | | |
| 1 | 0 | 0 | 0 | 7 | 4 | 11 |
| 2 | 1 | 0 | 1 | 3 | 6 | 9 |
| 3 | 2 | 0 | 2 | 7 | 3 | 10 |
| 4 | 1 | 1 | 2 | 8 | 9 | 17 |
| 5 | 0 | 0 | 0 | 6 | 5 | 11 |
| 6 | 1 | 1 | 2 | 4 | 2 | 6 |
| 7 | 0 | 0 | 0 | 9 | 8 | 17 |
| 8 | 3 | 0 | 3 | 7 | 9 | 16 |
| Average | 1.0 | 0.25 | 1.25 | 6.4 | 5.6 | 12.0 |

Example X

This example is directed to a visual determination of dextrin-containing vitamin particles of this invention in animal feeds.

15 lbs. of a feed having the composition stated in Example IX was admixed with 0.24 gram of the red dextrin-containing vitamin A palmitate particles prepared in Example I (potency of 125,000 U.S.P. units of vitamin A per gram) and 0.035 gram of dextrin-containing vitamin D particles prepared in Example IV (having a vitamin potency of 200,000 U.S.P. units per gram). The final feed had a vitamin A potency of 2,000 I.U. per lb. and a vitamin D potency of 500 I.U. per lb. The vitamin particles and the feed were thoroughly admixed by means of mechanical agitation. After thorough admixing, the vitamin fortified feed was analyzed by the dry examination and the wet examination outlined hereinbefore to detect the presence of the colored particles in the feed. The results of these tests appear in Table III.

vitamin potency the colored vitamin-containing particles of this invention than the colored vitamin-containing particles of the prior art. This enormous difference in the ability to detect the color of the vitamin in feeds makes it possible to determine by means of the naked eye the presence or absence of the vitamin particles in animal feeds. On the other hand, the colored vitamin-containing particles of the prior art cannot be readily detected by means of the naked eye in animal feeds, as seen by poor results that are obtained even when these particles are subjected to the analytical dry and wet determination. The wet and dry determination was utilized only to show comparative results between detecting the colored vitamin-containing particles of this invention an colored vitamin-containing particles of the prior art. The use of the dry or wet determination is unnecessary in detecting the colored vitamin-containing particles of this invention in animal feeds. This is shown by the fact that when the vitamin-containing particles were incorporated into the feed at TABLE III.—VISUAL DETERMINATION OF THE COLORED PARTICLES PRESENT IN THE FEED BY MEANS OF WET AND DRY EXAMINATION

|  | Dry Examination | | | Wet Examination | | |
|---|---|---|---|---|---|---|
|  | Red Particles Counted | Blue Particles Counted | Total Particles Counted | Red Spots Counted | Blue Spots Counted | Total Spots Counted |
| Sample: | | | | | | |
| 1 | 18 | 23 | 41 | 23 | 24 | 47 |
| 2 | 19 | 25 | 44 | 23 | 27 | 50 |
| 3 | 32 | 33 | 65 | 19 | 38 | 57 |
| 4 | 22 | 24 | 46 | 27 | 23 | 50 |
| 5 | 27 | 29 | 56 | 33 | 26 | 59 |
| 6 | 21 | 26 | 47 | 38 | 34 | 72 |
| 7 | 32 | 30 | 62 | 40 | 33 | 73 |
| 8 | 37 | 36 | 73 | 32 | 35 | 67 |
| Average | 26.0 | 28.3 | 54.3 | 29.4 | 30.0 | 59.4 |

In formulating the vitamin fortified feed prepared in Example IX, vitamin A particles were utilized which had a potency of 250,000 U.S.P. units per gram, whereas in the feed formulated in Example X the vitamin A particles had a potency of 150,000 U.S.P. units per gram. However, the final feeds formulated in both Examples IX and X had the same vitamin A potency. A vitamin A-gelatin particle having a potency of 250,000 U.S.P. units per gram was utilized since that is the lowest potency at which vitamin A-gelatin particles are commercially manufactured. This is true since, prior to this invention, it has been extremely difficult to manufacture low potency vitamin A particles by the prior art methods. However, by utilizing the process of this invention, low potency vitamin particles can be easily manufactured.

As seen by comparing the results of the dry examination in Tables II and III, the colored vitamin-containing particles of this invention are about thirty times more easily detectable than are the colored vitamin-containing particles of the prior art. The fact that the particles of this invention are four times as visible by a wet examination as the colored vitamin-containing particles of the prior art emphasizes that even by utilizing analytical means, it is still easier to detect in feeds having the same the level indicated in this example, both the blue and red colored particles were visible in the feed to the naked eye.

Example XI

This example is directed to showing the enhanced vitamin stability that is achieved by utilizing the vitamin formulation of this invention.

A sufficient amount of the vitamin-containing particles of Example I, II, III and V were separately placed in 1.0 lb. portions of feed having the formulation:

| Component: | Percent by weight |
|---|---|
| Ground milo | 52.25 |
| 44% soybean meal | 30.00 |
| Tallow | 4.00 |
| Meat and bone scraps | 4.00 |
| Fish meal | 3.00 |
| Dried whey | 2.00 |
| Distillers solubles | 2.00 |
| Bone meal | 1.25 |
| Limestone | 1.00 |
| Salt | 0.25 |
| Vitamin-Trace Mineral Premix[1] | 0.25 |

[1] Contains complete requirements for trace minerals and vitamins except vitamin A.

Each of the vitamin feeds was divided into three equal portions. One portion was placed in an oven at 98° F., the second portion was allowed to stand at room temperature for three months and the third portion was placed in a 114° F. oven. The portion which was placed in the 98° F. oven was assayed by removing a small portion of the sample at intervals of one month, two months and three months. The results of these assays were tabulated in Table IV. The portion which was placed in the oven at 114° F. was assayed by removing a small sample at intervals of three weeks and six weeks. The portion that was allowed to stand at room temperature was assayed at the end of three months. The results of these assays are tabulated in Table IV.

and all pertinent data was recorded at weekly intervals. The individual rations for the chicks were prepared at the beginning of the experiment from a freshly mixed large batch of non-supplemental ration mixed in a vertical Brower Whirlwind Type Mixer using a mixing cycle of twenty minutes. Rigid precautions were taken to assure complete stability of each vitamin source in the mixed ration. This was accomplished by (1) regulating the amount of feed to insure complete turnover in three days, and (2) by holding the unused portion of the diet or ration in cold storage.

At the 28-day junction a total of three chicks from each replica lot are selected at random for liver removal. The TABLE IV.—STABILITY OF MICRO-A PALMITATE IN A PELLETED BROILER FEED
[Theoretical Input=25,000 I.U. per lb.]

| Vitamin Product Tested | Initial Assay | Stability at 98° F. | | | Stability at 114° F. | | Stability at room temp. |
|---|---|---|---|---|---|---|---|
| | | 1 mo. | 2 mos. | 3 mos. | 3 wks. | 6 wks. | 3 mos. |
| Sample: | | | | | | | |
| I .......... Vitamin A palmitate, Dextrin ............ | 24,600 | 23,500 | 21,400 | 20,000 (81%) | 23,400 | 18,700 (76%) | 23,700 (96%) |
| II .......... Vitamin A acetate, Dextrin ............ | 25,300 | 23,600 | 21,100 | 19,400 (77%) | 22,500 | 18,600 (73%) | 23,100 (91%) |
| III .......... Vitamin A acetate-palmitate, dextrin .... | 24,400 | 23,500 | 22,000 | 19,500 (80%) | 21,900 | 17,900 (73%) | 22,800 (94%) |
| V .......... Vitamin A palmitate, gelatin ............ | 23,800 | 20,700 | 19,800 | 17,900 (75%) | 20,600 | 16,800 (70%) | 20,500 (86%) |

As seen from the results of the above table, the vitamin-containing particles of this invention are more stable than the vitamin-containing particles of the prior art utilizing gelatin and a stabilizer even though the particles of this invention do not contain any stabilizer.

chicks were decapitated and the freshly removed livers were placed into lots of three for vitamin assay. The average vitamin assay value of the livers was accepted as the criteria of the liver storage efficiency. The results of these tests are tabulated in Table V.

TABLE V.—BIOLOGICAL AVAILABILITY OF VITAMINS FROM DEXTRIN-CONTAINING VITAMIN PARTICLES VERSUS GELATIN CONTAINING PARTICLES
[4 wk. data, White Vantress Cockerels]

| Vitamin Product Tested | Input Level, I.U./lb. | 4 week gain | Gross feed required per gram gain | Total vitamin ingested | 4 week liver storage (I.U. per liver) | Percent of ingested vitamin stored in liver |
|---|---|---|---|---|---|---|
| Examples: | | | | | | |
| I ........ Vitamin A palmitate, dextrin ... | 4,800 | 434.8 | 1.779 | 8,185 | 3,320 | 40.6 |
| II ........ Vitamin A acetate, dextrin ...... | 4,800 | 439.2 | 1.791 | 8,304 | 3,390 | 40.8 |
| V ........ Vitamin A palmitate, gelatin .... | 4,800 | 435.7 | 1.826 | 8,419 | 3,090 | 36.7 |

Example XII

This example is directed to showing the increased biological availability of the vitamin particles of this invention in animal feeds as compared to vitamin products of the prior art. A sufficient amount of each of the vitamin-containing particles produced in Examples I, II and V was separately added to six feeds, each having the composition given in Example IX to produce a feed having a vitamin potency of 4,800 I.U. per lb. The same procedure employed in this example was followed. All tests were conducted on one-day old White Vantress cockerels. The test group varied from seven to nine chicks and were divided into three equal lots of chicks. The test was of a 28-day duration. During this time the chicks were housed in electrically heated starting batteries and food and water supplied ad libitum. The temperature of the starting batteries was maintained from about 80° F. to about 85° F. A special effort was made to minimize the effect of cage position upon the biological response by placing different lots of the same group in different cage positions. All chicks and feed were weighed at the beginning of the experiment As seen from the results of the table, the biological availability of vitamins from dextrin-containing vitamin particles is greater than that from gelatin-containing vitamin particles. This is shown by the fact that the percentage of ingested vitamin stored in the liver from dextrin-containing vitamins is much higher than that from gelatin-containing vitamin particles. Furthermore, the amount of units of vitamin per liver at the end of the test period was greater in the case of chickens fed with dextrin-containing vitamin particles than with gelatin-containing vitamin particles. This shows that a vitamin potency ingested in a chicken is greater when the vitamin is contained in a particle formulated from dextrin than in a particle formulated from gelatin.

Having described our invention, what we claim as new and desire to secure by Letters Patent is:

1. A method for visually detecting the presence of fat-soluble vitamins in animal feeds comprising
    (1) sampling an animal feed containing a multiplicity of colored solid flake-like particles having a vitamin potency of from about 1,500 U.S.P. units per gram to about 900,000 U.S.P. units per gram, said particles comprising a fat-soluble vitamin material selected from the group consisting of a fat-soluble Vitamin A-containing material, a fat-soluble Vitamin D-containing material, a fat-soluble Vitamin E-containing material, a fat-soluble Vitamin K-containing material, and mixtures thereof, a water-soluble dextrin, an edible non-toxic antioxidant, and a non-toxic dye,
(2) screening said feed and recovering that fraction of said feed which passes through a 40 mesh sieve and is retained on a 60 mesh sieve,
(3) pressing wet absorbent paper against said recovered fraction, and thereafter,
(4) inspecting the surface of said wet absorbent paper which was pressed against said colored particles.

References Cited

UNITED STATES PATENTS

| | | |
|---|---|---|
| 2,650,895 | 9/1953 | Wallenmeyer et al. ___ 99—11 X |
| 2,685,517 | 8/1954 | Dunmire. |
| 2,876,160 | 3/1959 | Schoch et al. _____ 99—11 X |
| 2,935,449 | 5/1960 | Bauley et al. _____ 99—111 X |
| 3,067,105 | 12/1962 | Ratish et al. |

A. LOUIS MONACELL, *Primary Examiner.*

J. M. HUNTER, *Assistant Examiner.*

U.S. Cl. X.R.

99—11; 167—53